(12) United States Patent
Boos

(10) Patent No.: US 10,836,428 B2
(45) Date of Patent: Nov. 17, 2020

(54) METHOD FOR CONTROLLING AN ARTICULATION ANGLE

(71) Applicant: Robert Bosch Automotive Steering GmbH, Schwäbisch Gmünd (DE)

(72) Inventor: Nicolas Boos, Mutlangen (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 349 days.

(21) Appl. No.: 15/766,389

(22) PCT Filed: Sep. 13, 2016

(86) PCT No.: PCT/EP2016/071495
§ 371 (c)(1),
(2) Date: Apr. 6, 2018

(87) PCT Pub. No.: WO2017/076539
PCT Pub. Date: May 11, 2017

(65) Prior Publication Data
US 2018/0290685 A1 Oct. 11, 2018

(30) Foreign Application Priority Data

Nov. 6, 2015 (DE) .......................... 10 2015 119 085

(51) Int. Cl.
*B62D 13/06* (2006.01)
(52) U.S. Cl.
CPC .................................... *B62D 13/06* (2013.01)
(58) Field of Classification Search
CPC ...................................................... B62D 13/06
See application file for complete search history.

(56) References Cited

U.S. PATENT DOCUMENTS 4,455,035 A * 6/1984 Ivony ................. B62D 53/0878
280/432
6,042,196 A * 3/2000 Nakamura ................ B60T 7/12
188/112 R (Continued)

FOREIGN PATENT DOCUMENTS

DE    10 2005 043 467 A1    3/2007
DE    10 2005 043 468 A1    3/2007

(Continued)

OTHER PUBLICATIONS

International Search Report corresponding to PCT Application No. PCT/EP2016/071495, dated Nov. 25, 2016 (German and English language document) (5 pages).

*Primary Examiner* — Russell Frejd
(74) *Attorney, Agent, or Firm* — Maginot, Moore & Beck LLP

(57) ABSTRACT

A method for controlling articulation angle during reversing of a vehicle combination, comprising a tractor motor vehicle having at least one trailer, uses a first articulation angle controller, which determines an intended steering lock from at least one steerable wheel of the tractor vehicle and controls the same via a steering actuator of the tractor motor vehicle, in order to achieve a predefined intended articulation angle of the vehicle combination. The rate of change of the articulation angle is limited in such a way that the maximum available setting speed of the steering actuator is sufficient, such that the movement of the at least one trailer follows the intended articulation angle, in particular over a predefined range of speed of travel of the vehicle combination.

12 Claims, 2 Drawing Sheets

(56) References Cited

U.S. PATENT DOCUMENTS

| | | | |
|---|---|---|---|
| 2004/0021291 A1* | 2/2004 | Haug | B60T 8/1708 |
| | | | 280/455.1 |
| 2005/0000738 A1 | 1/2005 | Gehring et al. | |
| 2008/0312792 A1* | 12/2008 | Dechamp | B62D 13/06 |
| | | | 701/41 |
| 2009/0306854 A1* | 12/2009 | Dechamp | B62D 13/06 |
| | | | 701/41 |
| 2010/0222964 A1* | 9/2010 | Dechamp | B62D 13/06 |
| | | | 701/41 |
| 2013/0179038 A1* | 7/2013 | Goswami | B62D 13/005 |
| | | | 701/42 |
| 2015/0149040 A1* | 5/2015 | Hueger | B62D 15/028 |
| | | | 701/41 |
| 2015/0197278 A1* | 7/2015 | Boos | B62D 15/0285 |
| | | | 701/2 |
| 2015/0198949 A1* | 7/2015 | Boos | G06F 3/04883 |
| | | | 701/2 |
| 2015/0360718 A1* | 12/2015 | Boos | B62D 6/003 |
| | | | 701/42 |
| 2016/0031482 A1* | 2/2016 | Lavoie | B60W 10/20 |
| | | | 701/41 |
| 2017/0320520 A1* | 11/2017 | Greul | B62D 15/027 |

FOREIGN PATENT DOCUMENTS

| | | |
|---|---|---|
| DE | 10 2005 043 470 A1 | 3/2007 |
| DE | 10 2014 201 841 A1 | 8/2014 |
| DE | 10 2014 002 856 A1 | 8/2015 |
| DE | 10 2014 003 779 A1 | 9/2015 |
| EP | 1 810 913 A1 | 7/2007 |
| EP | 2 439 127 A1 | 4/2012 |

\* cited by examiner

METHOD FOR CONTROLLING AN ARTICULATION ANGLE

This application is a 35 U.S.C. § 371 National Stage Application of PCT/EP2016/071495, filed on Sep. 13, 2016, which claims the benefit of priority to Serial No. DE 10 2015 119 085.0, filed on Nov. 6, 2015 in Germany, the disclosures of which are incorporated herein by reference in their entirety.

The disclosure relates to a method for controlling the actuation angle during the reversing of a vehicle combination, comprising a tractor motor vehicle having at least one trailer of the type defined herein.

BACKGROUND

There are a multiplicity of methods for controlling the actuation angle between the trailer and tractor vehicle or tractor motor vehicle during the reversing of a vehicle combination having a trailer. These methods generally determine a target wheel steering angle from a predefined target actuation angle between the trailer and the tractor vehicle using a suitable control algorithm, in order to obtain the target actuation angle. This target wheel steering angle is applied by means of a suitable steering system. There are both methods in which the front wheels of the tractor vehicle are steered and methods in which the rear wheels of the tractor vehicle are steered.

According to the methods described in EP 2 439 127 A1, US 2005/000 738 A1 and EP 1 810 913 A1 the driver of a vehicle combination having a trailer is assisted during reversing in that said driver predefines the target actuation angle between the tractor vehicle and the trailer, and said target actuation angle is applied by the steering system.

During the reversing of one or more trailers, small changes in the steering wheel angle can give rise to large changes in the actuation angle and very high actuation angle speeds or rates of change of the actuation angle. The higher the vehicle speed, the more pronounced is this behavior. The higher the actuation angle speed, the faster the steering actuator has to react with the steering movements. Since the steering actuator is physically limited in its actuating speed, the steering actuator can no longer control the actuation angle in a stable fashion starting from a certain vehicle speed or actuation angle speed, which can give rise to unstable states extending as far as a collision of the vehicle and the trailer (jackknifing). Therefore, situations can occur in which the steering system cannot follow the desired target steering lock or target wheel steering angle. This can lead, for example, to the desired target steering angle being obtained only after a relatively large distance, or even to a situation in which the control error of the articulation angle becomes larger and not smaller, and therefore the control or the control device used for this purpose becomes unstable.

The present disclosure is therefore based on the object of providing a method for controlling the actuation angle of the type mentioned at the beginning which can be used reliably even at relatively high speeds, in particular permits stable actuation angle control.

SUMMARY

According to the disclosure this object is achieved by means of the features specified herein.

According to the disclosure, a method is proposed for controlling the actuation angle during the reversing of a vehicle combination, comprising a tractor motor vehicle having at least one trailer by means of a first actuation angle controller which determines a target steering lock of at least one steerable wheel of the tractor motor vehicle and controls the same using a steering actuator of the tractor motor vehicle, in order to obtain a predefined target actuation angle of the vehicle combination, wherein the rate of change of the actuation angle is limited in such a way that the maximum available actuation speed of the steering actuator is sufficient for the movement of the at least one trailer to follow the target actuation angle, in particular over a predefined speed range of the vehicle combination.

In order to permit stable actuation angle control at rising speeds, in the proposed method the actuation angle speed or the rate of change of the actuation angle is limited. The actuation angle speed is limited here in such a way that the actuating speed of the steering actuator is sufficient to stabilize the trailer movements, or apply them in a stable fashion, in particular over a predefined speed range of the vehicle combination. The predefined speed range of the vehicle combination can be, for example, 1 km/h to 10 km/h here but can also be the entire possible speed range of the vehicle combination. In particular, even at relatively high speeds or rising speeds, e.g. >20 km/h, stable control is to be reliably possible. In an advantageous way it is also to be possible to drive at a constant speed, in particular at relatively high speeds or vehicle speeds.

The target actuation angle can be limited in terms of its rate of change, in particular as a function of the speed of the vehicle combination, before said target actuation angle is transferred to the first actuation angle controller.

The actuation angle speed is limited in that the target actuation angle is limited in its rate of change before the target actuation angle is transferred to an existing actuation angle controller. This results in a maximum target actuation angle speed. The existing actuation angle controller therefore ensures there is a limited actuation angle speed. It is advantageous if the maximum rate of change of the target actuation angle can be set as a function of the vehicle speed.

It is advantageous if at least a second controller, in particular an actuation angle speed controller, is connected in parallel with the first articulation angle controller.

Therefore, an actuation angle speed controller is connected in parallel with an existing actuation angle controller. Both controllers can act on the steering actuator.

The target steering lock or actuating command for the steering actuator can be formed from addition or summing of a first target steering lock of the first actuation angle controller and of a second target steering lock of the second controller.

The steering lock (target steering lock) which is requested by the steering actuator can consequently be formed by summing the target steering lock of the existing actuation angle controller and the target steering lock of the actuation angle speed controller or of the second controller. The actuation angle speed controller can ensure that the actuation angle speed remains within the predefined limits. The second controller or the actuation angle speed controller can be, for example, a PID controller.

It is advantageous if the second controller is active as soon as the rate of the change of the actuation angle exceeds a predefined limiting value.

The second controller or the actuation angle speed controller can become active as soon as the actuation angle speed exceeds a predefined limit. For this purpose, for example the negated actuation angle speed can be adjusted through a dead zone or plus/minus limit and then transferred as a control error to the actuation angle speed controller, in particular a PID controller.

The at least one predefined limiting value can be set as a function of the speed of the vehicle combination.

It is advantageous if the limit for the dead zone of the actuation angle speed can be set as a function of the vehicle speed. The predefined limiting value can be here an absolute value which is provided in each case with positive and negative signs which form the dead zone.

In one advantageous refinement of the disclosure, a cascade controller can be used as the first actuation angle controller.

The actuation angle is therefore controlled by means of a cascade controller. In this cascade structure, the angle and the speed can be controlled.

In an advantageous fashion, in the cascade controller a target actuation angle speed can be determined from a control difference between the target actuation angle and the actual actuation angle or the actuation angle using a first partial controller of the cascade controller, which target actuation angle speed is limited to predefined limiting values, after which a control difference is formed between the limited target actuation angle speed and the rate of change of the actual actuation angle and is transferred to an input of a second partial controller of the cascade controller which calculates the target steering lock.

In such a cascade controller, a target actuation angle speed is firstly calculated from the control difference of the actuation angle, that is to say the difference between the target actuation angle and the actual actuation angle using a controller, in particular a PID controller. The target actuation angle speed is subsequently limited to predefined limits or limiting values. A target steering lock or an actuating command for the steering actuator is calculated from the control difference between the limited target actuation angle speed and the actual actuation angle speed using a further controller, in particular PID controller. It is advantageous if the predefined limiting value is for the target actuation angle speed can be set as a function of the speed of the vehicle combination.

It is very advantageous if the target steering lock of the first actuation angle controller is limited dynamically by means of a model for an upper limit and a lower limit of the target actuation angle speed. In this context, the upper limit and the lower limit of the target articulation angle speed can be set as a function of the speed of the vehicle combination.

As a result of these measures, the target steering lock of an actuation angle controller is dynamically limited, with the result that no actuation angle speeds which are above the predefined limiting values or the predefined limits are produced. The upper and lower limits for the target steering lock are calculated from the upper and lower limits for the target actuation angle speed and driving state variables using a model. For example the following can be selected: lower limit of the target actuation angle speed=−upper limit of the target actuation angle speed. The calculation can be carried out by means of the following formulas:

$$\delta_{max} = \arctan\left(\frac{\dot{Y}_{max} + \frac{v}{l_2}\sin(\gamma)}{\frac{v}{l_1} + \frac{v l_{12}}{l_1 l_2}\cos(\gamma)}\right) \text{ and}$$

$$\delta_{min} = \arctan\left(\frac{\dot{Y}_{min} + \frac{v}{l_2}\sin(\gamma)}{\frac{v}{l_1} + \frac{v l_{12}}{l_1 l_2}\cos(\gamma)}\right).$$

where:
$\delta_{max}$ is the upper limit for the steering lock;
$\delta_{min}$ is the lower limit for the steering lock;
$\dot{Y}_{max}$ is the predefined upper limit for the target actuation angle speed;
$\dot{Y}_{min}$ is the predefined lower limit for the target actuation angle speed;
v is the vehicle speed;
γ is the actuation angle;
$l_1$ is the distance between the axles of the tractor vehicle;
$l_2$ is the distance between the trailer hitch and the centerpoint of the wheels of the trailer; and
$l_{12}$ is the distance between the rear axle of the tractor vehicle and the trailer hitch.

It is advantageous if the limit for the actuation angle speed can be set as a function of the vehicle speed or the speed of the vehicle combination. The vehicle speed for the model can be the actual vehicle speed or the target vehicle speed or a combination of both. The actuation angle for the model can be the actual actuation angle or the target actuation angle or a combination of both. The model is used to calculate, as it were, which absolute value of the manipulated variable is available, wherein only this manipulated variable is also used. As a result, direct protection against excessively high actuation angle speeds is advantageously provided. As a result, it is possible to apply the desired actuation angle with the maximum possible performance, wherein a situation in which instabilities or other problems can occur can be effectively avoided.

A multiplicity of electronic power steering devices, in particular an EPS (electric power steering) steering system or an AFS (active front steering) steering system but also steer-by-wire steering systems are possible as steering actuators.

Therefore, in order to limit the actuation angle speed the following refinements according to the disclosure are proposed:
limitation of the rate of change of the target actuation angle for an existing, i.e. the first, actuation angle controller;
limitation of the actuation angle speed using at least a second or further controller, which is connected in parallel with a first or existing actuation angle controller;
control of the actuation angle using a cascade controller with an angle and speed; and
model-based limitation of the manipulated variable of the steering lock of an existing or first actuation angle controller.

The proposed refinements of the method according to the disclosure can, of course, also be used in combination with one another.

BRIEF DESCRIPTION OF THE DRAWINGS

Advantageous refinements and developments of the disclosure can be found in the dependent claims. Exemplary embodiments of the disclosure are described in basic form below with reference to the drawing, in which:

DETAILED DESCRIPTION

Figure 1:
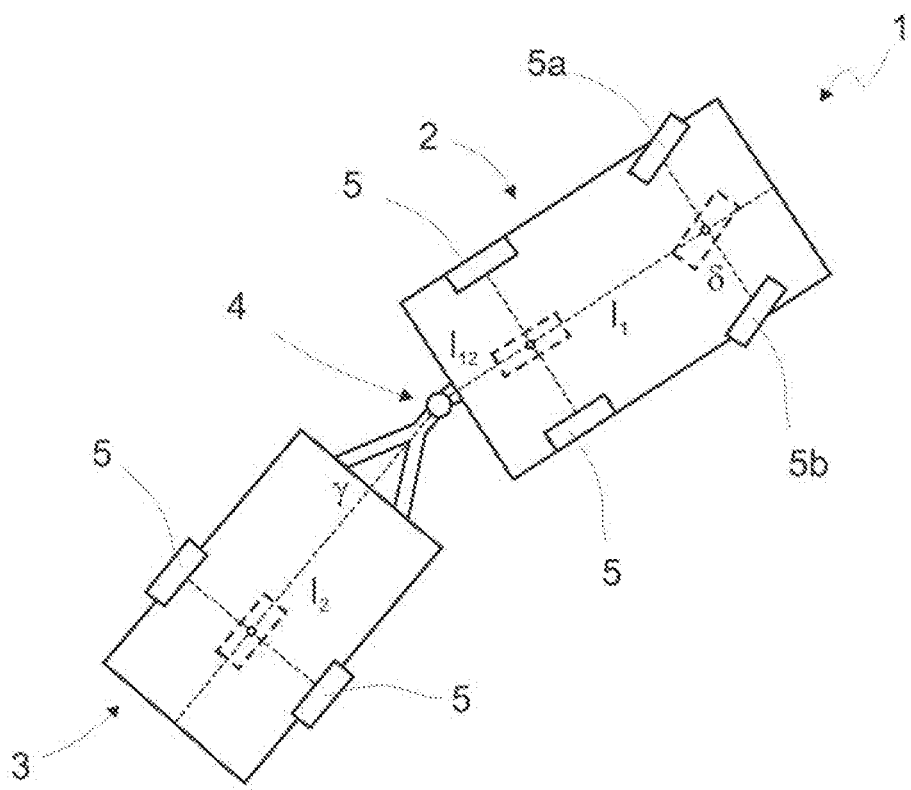
FIG. 1 shows a schematic illustration of a vehicle combination with an indicated single-trade model clarifying a method according to the disclosure.

FIG. 1 shows, for the sake of clarifying a method according to the disclosure, a motor vehicle combination or vehicle combination 1 comprising a tractor motor vehicle 2 and a trailer 3 coupled thereto. The wheels of the vehicles 2 and 3 are provided with the reference number 5. The tractor motor vehicle 2 has as a steering actuator a steering system (not illustrated in more detail) which can be embodied, for example, as an EPS (electric power steering) steering system or AFS (active front steering) steering system, and wheels 5a, 5b which can be steered thereby. The tractor motor vehicle 2 is provided with a trailer hitch 4. A single-track model of the vehicle trailer 1 is indicated by dashed lines in simplified form in FIG. 1. An actuation angle γ is present between the tractor motor vehicle 2 and the trailer 3. The wheel steering angle of the steerable wheels 5a, 5b of the tractor motor vehicle 2 is denoted by δ. An actuation angle γ is present between the tractor motor vehicle 2 and the trailer 3. The length $I_1$ denotes the distance between the axles of the tractor motor vehicle 2. The length $I_2$ denotes the distance between the trailer hitch 4 and a centerpoint between the wheels 5 of the trailer 3. The length $I_{12}$ denotes the distance between a rear axle of the tractor motor vehicle 2 and the trailer hitch 4.

FIG. 1 shows, for the sake of clarifying a method according to the disclosure, a motor vehicle combination or vehicle combination 1 comprising a tractor motor vehicle 2 and a trailer 3 coupled thereto. The wheels of the vehicles 2 and 3 are provided with the reference number 5. The tractor motor vehicle 2 has as a steering actuator a steering system (not illustrated in more detail) which can be embodied, for example, as an EPS (electric power steering) steering system or AFS (active front steering) steering system, and wheels 5a, 5b which can be steered thereby. The tractor motor vehicle 2 is provided with a trailer hitch 4. A single-track model of the vehicle trailer 1 is indicated by dashed lines in simplified form in FIG. 1. An actuation angle γ is present between the tractor motor vehicle 2 and the trailer 3. The wheel steering angle of the steerable wheels 5a, 5b of the tractor motor vehicle 2 is denoted by δ. An actuation angle γ is present between the tractor motor vehicle 2 and the trailer 3. The length $I_1$ denotes the distance between the axles of the tractor motor vehicle 2. The length $I_2$ denotes the distance between the trailer hitch 4 and a centerpoint between the wheels 5 of the trailer 3. The length $I_{12}$ denotes the distance between a rear axle of the tractor motor vehicle 2 and the trailer hitch 4.

Functionally identical elements are provided with the same reference symbols in the figures.

Figure 2:
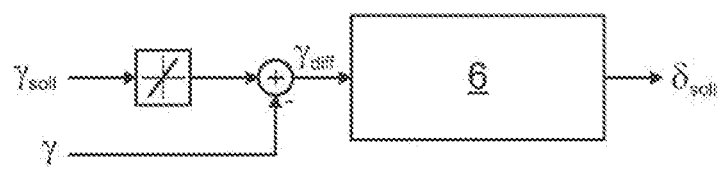
FIG. 2 shows a simplified block diagram illustrating a first embodiment of the method according to the disclosure.

FIG. 2 shows a simplified block diagram illustrating a first embodiment of the method according to the disclosure invention. In this context, the target actuation angle $γ_{soll}$ and its rate of change are limited, in particular, as a function of the speed v of the vehicle combination 1 (not illustrated) before said target actuation angle $γ_{soll}$ is transferred to the first actuation angle controller 6. As is also apparent from FIG. 2, the first actuation angle controller 6 receives an actuation angle difference $γ_{diff}$ (control difference between the target actuation angle $γ_{soll}$ and the actual actuation angle γ) as an input signal, wherein the rate of change of the target actuation angle $γ_{soll}$ is limited before the actuation angle difference $γ_{diff}$ is formed by means of the actual actuation angle γ. The first actuation angle controller 6 supplies the target steering lock $δ_{soll}$ as an output signal. The target steering lock $δ_{soll}$ predefines an actuating value for the steering actuator.

Figure 3:
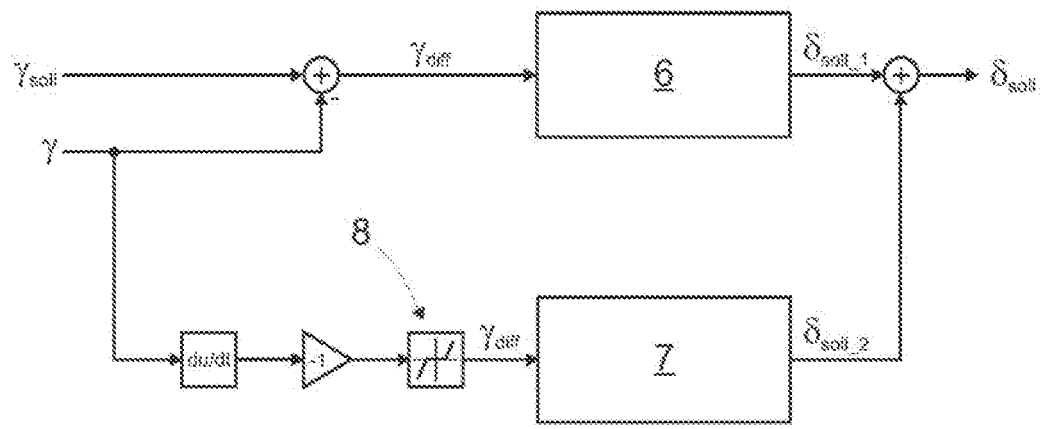
FIG. 3 shows a simplified block diagram illustrating a second embodiment of the method according to the disclosure.

FIG. 3 shows a simplified block diagram illustrating a second embodiment of the method according to the disclosure invention. As is apparent from FIG. 3, a second controller which is embodied as an articulation speed controller 7 is connected in parallel with the first actuation angle controller 6. The target steering lock $δ_{soll}$ is formed from addition of a first target steering lock $δ_{soll\_1}$ of the first actuation angle controller 6 and of a second target steering lock $δ_{soll\_2}$ of the actuation angle speed controller 7. The actuation angle speed controller 7 becomes active as soon as the rate of change of the actuation angle γ exceeds a predetermined limiting value. This predefined limiting value can be set as a function of the speed v of the vehicle combination 1 (not illustrated). The actuation angle speed controller 7 ensures that the actuation angle speed remains within the predefined limits. The actuation angle speed controller 7 can be embodied, for example, as a PID controller. In the present exemplary embodiment, the negated actuation angle speed is adjusted through a dead zone 8 and is then transferred as an actuation angle speed difference $\dot{Y}_{diff}$ to the actuation angle speed controller 7.

Figure 4:
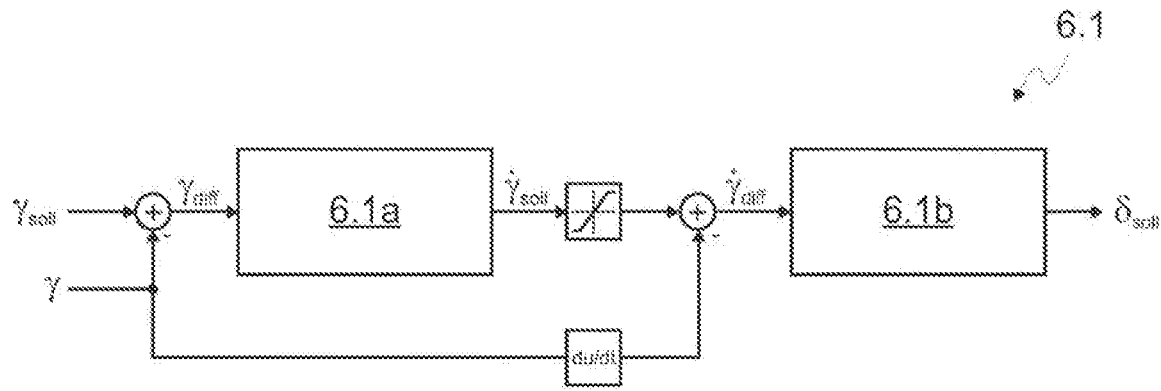
FIG. 4 shows a simplified block diagram illustrating a third embodiment of the method according to the disclosure.

FIG. 4 shows a simplified block diagram illustrating a third embodiment of the method according to the disclosure. In this context, a cascade controller 6.1 is used as the first actuation angle controller. As is apparent from FIG. 4, a target actuation angle speed $\dot{Y}_{soll}$ is determined in the cascade controller 6.1 from the control difference $\dot{Y}_{diff}$ between the target actuation angle $\dot{Y}_{soll}$ and the actual actuation angle γ using a first partial controller 6.1a of the cascade controller 6.1, which target actuation angle speed $\dot{Y}_{soll}$ is limited to predefined limiting values, after which a control difference is formed between the limited target actuation angle speed $\dot{Y}_{soll}$ and the rate of change of the actual actuation angle γ that is to say an actuation angle speed difference $\dot{Y}_{diff}$ and is transferred to an input of a second partial controller 6.1b of the cascade controller 6.1 which ultimately calculates the target steering lock $δ_{soll}$.

The predefined limiting values can be set here as a function of the speed v of the vehicle combination 1 (not illustrated in FIG. 4).

Figure 5:
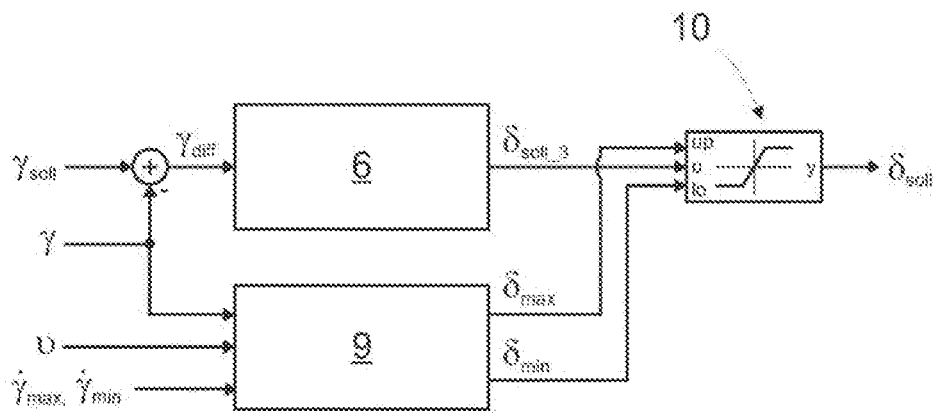
FIG. 5 shows a simplified block diagram illustrating a fourth embodiment of the method according to the disclosure.

FIG. 5 shows a simplified block diagram illustrating a fourth embodiment of the method according to the disclosure. As is apparent from FIG. 5, the target steering lock $δ_{soll\_3}$ of the first actuation angle controller 6 is limited dynamically by means of a model 9 for an upper limit $\dot{Y}_{max}$ and a lower limit $\dot{Y}_{min}$ of the target actuation angle speed $\dot{Y}_{soll}$. The upper limit $\dot{Y}_{max}$ and the lower limit $\dot{Y}_{min}$ of the target actuation angle speed $\dot{Y}_{soll}$ are set as a function of the speed v of the vehicle combination 1. The model 9 receives, as input signals, the actual actuation angle γ, the speed v of the vehicle combination 1 and the upper limit $\dot{Y}_{max}$ or the lower limit $\dot{Y}_{min}$ of the target actuation angle speed $\dot{Y}_{soll}$ and determines therefrom upper and lower limits $\delta_{max}$, $\delta_{min}$ for the target steering lock $\delta_{soll}$ as output signals. In the present exemplary embodiment the following applies: lower limit $\dot{Y}_{min}$ of the target actuation angle speed $\dot{Y}_{soll}$=–upper limit $\dot{Y}_{max}$ of the target actuation angle speed $\dot{Y}_{soll}$. Another selection of these variables it is, of course, also conceivable. A limiting means 10 receives for this purpose the upper limit $\delta_{max}$ of the target steering lock $\delta_{soll}$ as an input signal up and the lower limit $\delta_{min}$ of the target steering lock $\delta_{soll}$ as an input signal lo from the first actuation angle controller 6 as an input signal u of the calculated target steering lock $\delta_{soll\_3}$ and from the model 9, and determines therefrom the target steering lock $\delta_{soll}$, to be transferred to the steering actuator, as an output signal y.

The calculation of the model 9 can be carried out by means of the following formulas:

$$\delta_{max} = \arctan\left(\frac{\dot{Y}_{max} + \frac{v}{l_2}\sin(\gamma)}{\frac{v}{l_1} + \frac{vl_{12}}{l_1 l_2}\cos(\gamma)}\right) \text{ and}$$

$$\delta_{min} = \arctan\left(\frac{\dot{Y}_{min} + \frac{v}{l_2}\sin(\gamma)}{\frac{v}{l_1} + \frac{vl_{12}}{l_1 l_2}\cos(\gamma)}\right).$$

Here:
$\delta_{max}$ is the upper limit for the steering lock;
$\delta_{mim}$ is the lower limit for the steering lock;
$\dot{Y}_{max}$ is the predefined upper limit for the target actuation angle speed $\dot{Y}_{soll}$;
$\dot{Y}_{min}$ is the predefined lower limit for the target actuation angle speed $\dot{Y}_{soll}$;
v is the vehicle speed;
γ is the actuation angle;
$l_1$ the distance between the axles of the tractor vehicle;
$l_2$ is the distance between the trailer hitch and the centerpoint of the wheels of the trailer; and
$l_{12}$ is the distance between the rear axle of the tractor vehicle and the trailer hitch.

The refinements of the method according to the disclosure which are described in FIGS. 2 to 5 can, of course, also be combined with one another.

LIST OF REFERENCE SYMBOLS 1 vehicle combination
2 tractor motor vehicle
3 trailer
4 trailer hitch
5,5a,5b wheels
6, 6.1 first actuation angle controller
7 actuation angle speed controller
8 dead zone
9 model
10 limiting means
V (actual) vehicle speed or speed
δ wheel steering angle
γ actuation angle, actual actuation angle
$l_1$, $l_2$, $l_{12}$ lengths
$Y_{soll}$ target actuation angle
$\delta_{soll}$, $\delta_{soll\_3}$ target steering lock
$\delta_{soll\_1}$ first target steering lock
$\delta_{soll\_2}$ second target steering lock
$\delta_{max}$,up upper limit of steering lock
$\delta_{min}$,lo lower limit of steering lock
$\dot{Y}_{diff}$ control difference, actuation angle difference
$\dot{Y}_{diff}$ actuation angle speed difference
$\dot{Y}_{soll}$ target actuation angle speed
$\dot{Y}_{max}$ upper limit for the actuation angle speed
$\dot{Y}_{min}$ lower limit for the actuation angle speed
u input signal
y output signal

The invention claimed is:

1. A method for controlling an actuation angle during reversing of a vehicle that includes a tractor motor vehicle and at least one trailer, the actuation angle being an angle between the tractor motor vehicle and the at least one trailer, the method comprising:
measuring the actuation angle between the tractor motor vehicle and the at least one trailer;
determining a target actuation angle between the tractor motor vehicle and the at least one trailer;
determining, with a first actuation angle controller, a target steering lock of at least one steerable wheel of the tractor motor vehicle based on the measured actuation angle and the target actuation angle; and
controlling the at least one steerable wheel using a steering actuator of the tractor motor vehicle based on the target steering lock to provide the target actuation angle between the tractor motor vehicle and the at least one trailer,
wherein at least one of the target actuation angle and the target steering lock are determined so as to limit a rate of change of the actuation angle within predefined limiting values such that a maximum available actuation speed of the steering actuator is sufficient for a movement of the at least one trailer to follow the target actuation angle.

2. The method as claimed in claim 1, the determining the target actuation angle further comprising:
limiting a rate of change of the target actuation angle within the predefined limiting values.

3. The method as claimed in claim 1, further comprising:
connecting at least one second controller in parallel with the first actuation angle controller.

4. The method as claimed in claim 3, further comprising:
forming the target steering lock from addition of a first target steering lock of the first actuation angle controller and of a second target steering lock of the at least one second controller.

5. The method as claimed in claim 3, wherein the at least one second controller is active as soon as the rate of change of the actuation angle exceeds a respective limiting value of the predefined limiting values.

6. The method as claimed in claim 5, further comprising:
setting the predefined limiting values as a function of a speed of the vehicle combination.

7. The method as claimed in claim 1, further comprising:
using a cascade controller as the first actuation angle controller.

8. The method as claimed in claim 7, further comprising:
determining, in the cascade controller, a target actuation angle speed from a control difference between the target actuation angle and the measured actuation angle using a first partial controller of the cascade controller;
limiting the target actuation angle speed within the predefined limiting values;
forming a control difference between the limited target actuation angle speed and the rate of change of the measured actuation angle; and transferring the formed control difference to an input of a second partial controller of the cascade controller which calculates the target steering lock.

9. The method as claimed in claim 8, further comprising:
limiting the target steering lock of the first actuation angle controller dynamically with a model for an upper limit and a lower limit of the target actuation angle speed, the predefined limiting values including the upper limit and the lower limit.

10. The method as claimed in claim 9, wherein in the model the following applies for the upper limit of the target actuation angle speed with respect to the upper limit for the steering lock:

$$\delta_{max} = \arctan\left(\frac{\dot{Y}_{max} + \frac{v}{l_2}\sin(\gamma)}{\frac{v}{l_1} + \frac{vl_{12}}{l_1 l_2}\cos(\gamma)}\right),$$

where $\delta_{max}$ is the upper limit for the steering lock, $\dot{Y}_{max}$ is the upper limit of the target actuation angle speed, v is a speed of the vehicle, $\gamma$ is the actuation angle, $l_1$ is the distance between the axles of the tractor vehicle, $l_2$ is the distance between the trailer hitch and the centerpoint of the wheels of the trailer, and $l_{12}$ is the distance between a rear axle of the tractor vehicle and the trailer hitch.

11. The method as claimed in claim 9, wherein in the model the following applies for the lower limit of the target actuation angle speed with respect to the lower limit for the steering lock:

$$\delta_{min} = \arctan\left(\frac{\dot{Y}_{min} + \frac{v}{l_2}\sin(\gamma)}{\frac{v}{l_1} + \frac{vl_{12}}{l_1 l_2}\cos(\gamma)}\right),$$

where $\delta_{min}$ is the lower limit for the steering lock, $\dot{Y}_{min}$ is the lower limit of the target actuation angle speed, v is the tractor motor vehicle speed, $\gamma$ is the actuation angle, $l_1$ is a distance between axles of the tractor motor vehicle, $l_2$ is a distance between a trailer hitch and a centerpoint of wheels of the tractor motor vehicle, and $l_{12}$ is a distance between a rear axle of the tractor motor vehicle and the trailer hitch.

12. The method as claimed in claim 8, wherein the upper limit and the lower limit of the target actuation angle speed are set as a function of the speed of the vehicle combination.

* * * * *

UNITED STATES PATENT AND TRADEMARK OFFICE
CERTIFICATE OF CORRECTION

PATENT NO. : 10,836,428 B2
APPLICATION NO. : 15/766389
DATED : November 17, 2020
INVENTOR(S) : Nicolas Boos It is certified that error appears in the above-identified patent and that said Letters Patent is hereby corrected as shown below:

In the Claims

In Claim 10, at Column 9, Lines 22-23, "$\dot{Y}_{max}$, is the upper limit of the target actuation angle speed" should read -- $\dot{Y}_{max}$ is the upper limit of the target actuation angle speed --.

Signed and Sealed this
Second Day of February, 2021

Drew Hirshfeld
*Performing the Functions and Duties of the
Under Secretary of Commerce for Intellectual Property and
Director of the United States Patent and Trademark Office*